United States Patent Office 3,191,113
Patented June 22, 1965

3,191,113
SYSTEMS FOR SUPPLYING DIRECT-CURRENT PULSES TO A LOAD PARTICULARLY A SERIES-MOTOR
Arnold J. Gargani, Norristown, Pa., assignor to Leeds and Northrup Company, Philadelphia, Pa., a corporation of Pennsylvania
Filed Apr. 18, 1962, Ser. No. 188,457
15 Claims. (Cl. 318—252)

This invention relates to systems for supplying a load with direct-current constant-amplitude pulses whose repetition rate and duration may be varied, and particularly relates to systems in which such load is a split-field series-motor for attainment of optimum starting torque in both directions of rotation concurrently with stable operation at any speed within a continuous range from maximum speed of the order of hundreds of revolutions per minute to less than one revolution per hour.

In accordance with the invention, a controlled rectifier in series with the load and a direct-current supply source is periodically turned on by gating pulses to complete an energizing circuit for the load, to complete the charging circuit of a capacitor and to activate a control-pulse generator. For each of its cycles, the pulse generator produces a control pulse which turns on a second controlled-rectifier to complete a discharge path for the capacitor through the two controlled-rectifiers in series. A reverse current produced by the discharging of the capacitor in a path including the first controlled-rectifier turns off the first controlled-rectifier to disconnect the load from the supply source and to deenergize the control-pulse generator. A second capacitor in such discharge path continues to be charged through the second controlled-rectifier until the voltage of the second capacitor exceeds the supply voltage whereupon the second controlled-rectifier is turned off and the second capacitor discharges through a bleeder resistor. This system cycle repeats so long as gating pulses are applied to the first controlled-rectifier. The repetition rate of the gating pulses and the period of the pulse generator may be preset independently to control the repetition rate and duration of the pulses supplied to the load.

Further in accordance with the invention, the charging path of the first capacitor includes a resistor of magnitude for aiding maintenance of current through the first rectifier at hold-in value during rise of the current to an inductive load to such hold-in value. Such damping resistor is effectively excluded from the discharge path of the first capacitor by a diode so as to provide prompt shutoff of the first controlled-rectifier.

Further in accordance with the invention as used for pulse-energization of a split-field series-motor, the two field circuits of the motor are respectively controlled as above described to effect operation of the motor in either selected direction. In such case, the periodic gating pulses are produced by a single pulse generator and are routed by the selected one of two direction-switches to the gate electrode of a corresponding one of the load-control rectifiers. An Exclusively-Or circuit may be provided to preclude energization of the motor should both direction-switches be concurrently in closed position.

Further in accordance with the invention, it is provided that the current-supply source will be disconnected in event the energization of the load circuit or circuits becomes continuous instead of pulsed. Specifically, an RC circuit is connected in parallel to the load and the capacitor is in parallel to a circuit including a fail-safe relay in series with a normally non-conductive four-layer diode. Upon continuous excitation of the load circuit, the fail-safe relay is energized when the voltage across said capacitor of the RC circuit exceeds a predetermined maximum fraction of the supply voltage corresponding with the breakdown voltage of the four-layer diode.

The invention further resides in solid-state circuitry having novel and useful features of combination and arrangement hereinafter described and claimed.

For a more detailed understanding of the invention, reference is made in the following description of embodiments thereof to the accompanying drawings in which.

Figure 1:
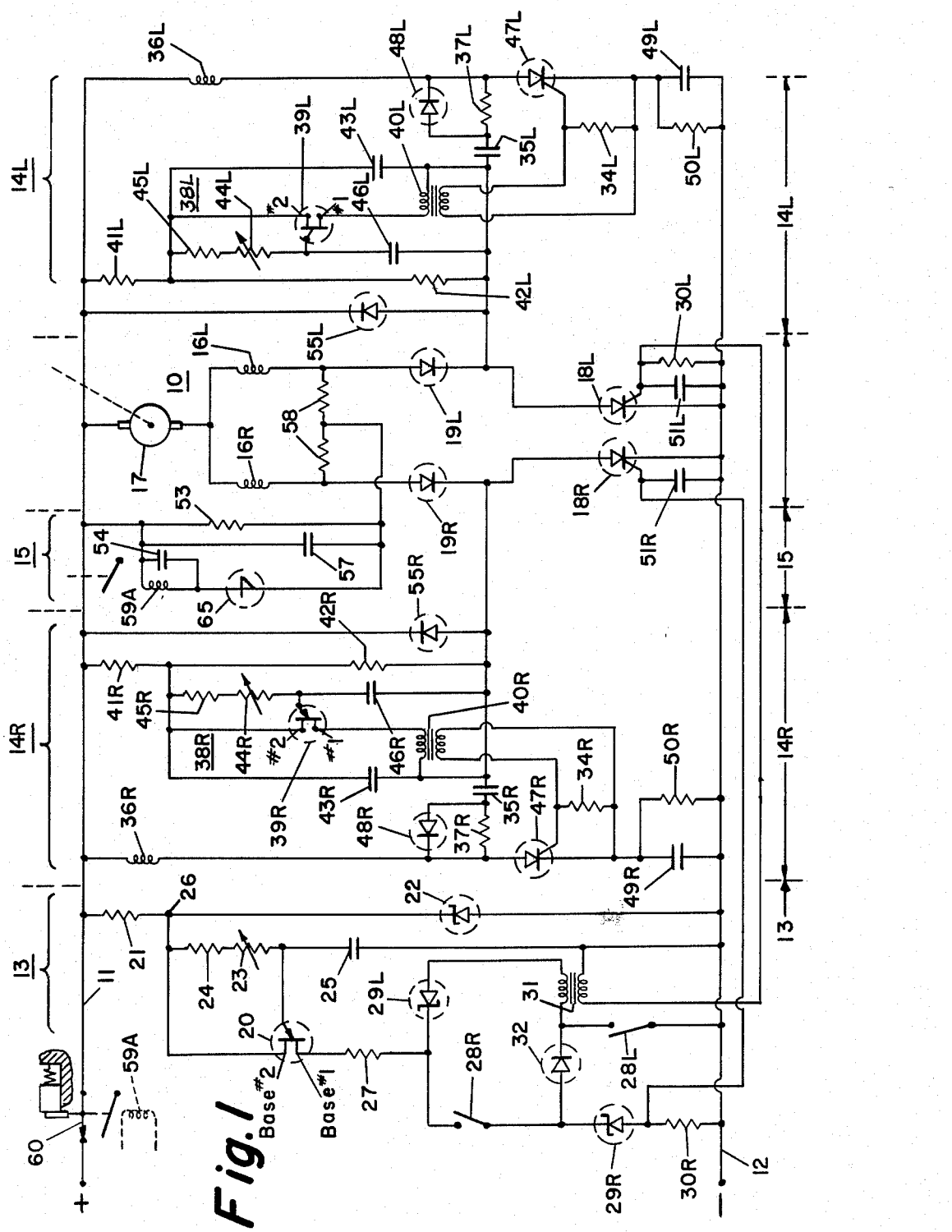
FIG. 1 is a circuit diagram of a solid-state control system for a split-field series-motor.

Referring to FIG. 1, the motor 10 is a reversible series-motor which may be used to change the setting of the governor for the turbine of an electrical generating unit. In such use, the direction of rotation of the motor determines whether the generating unit shall pick up or drop load and the speed of the motor determines the rate at which the unit assumes or relinquishes load. The system described provides for adjustment of the motor speed in both directions over a very wide continuous range while maintaining optimum starting torque even at very low speeds. A direct-current supply source is connected to the supply lines 11, 12 to provide excitation for the motor 10 and for the associated circuitry including the pulse generator 13, the pulse-duration circuits 14R, 14L and the fail-safe circuit 15.

The field winding 16R and armature 17 of the motor are connected across the suply line in series with the controlled-rectifier 18R and the diode 19R. The field winding 16L and the armature 17 are similarly connected in series with the supply source through the controlled-rectifier 18L and diode 19L. Thus, when one or the other of the controlled-rectifiers 18R, 18L is gated to the conductive state, one or the other of the field windings 16R, 16L is excited concurrently with the armature for rotation of the motor in a corresponding direction.

The turning on of the controlled-rectifiers 18R, 18L is effected by gating pulses periodically produced by the pulse generator 13 including the unijunction transistor 20. The #2 base electrode of transistor 20 is connected to junction-point 26 of resistor 21 and Zener diode 22 which are connected in series across the supply line. The #2 base electrode is also connected to the emitter electrode by adjustable resistance means including rheostat 23 and fixed resistor 24. The emitter of transistor 20 is also connected to capacitor 25 which is connected in series with resistors 21, 24 and 23 across the supply line. Under stand-by conditions, i.e. with switches 28R and 28L open, the capacitor 25 is charged to the potential of junction point 26 and the #1 base, #2 base and emitter electrodes are at the same potential. The #1 base electrode of transistor 20 is connected through resistor 27 to a divided output circuit, one of whose branches includes direction-switch 28R. Zener diode 29R and output coupling resistor 30R, and the other of whose branches includes direction-switch 28L, the primary of transformer 31 and Zener diode 29L.

With switch 28R alone closed, the #1 base electrode of transistor 20 is connected to the negative supply line 12 through Zener diode 29R and resistor 30R for activation of the pulse generator 13 and the resulting pulses, as appearing across the output resistor 30R of the relaxation oscillator 13, are impressed upon the gate electrode of controlled-rectifier 18R to initiate conduction periods providing for flow of current pulses through field winding 16R of motor 10. With switch 28L alone closed, the pulse generator 13 is similarly activated, but the output pulses are routed by transformer 31 to the gate electrode of controlled-rectifier 18L to initiate conductive periods providing for flow of current pulses through field winding 16L of motor 10. In short, the closing of either one or the other of switches 28R, 28L serves two functions: the pulse generator 13 is turned on and its pulse output is channeled to the gate electrode of that one of the controlled-rectifiers 18R, 18L which corresponds with the selected motor direction.

Should both of switches 28R, 28L be concurrently in closed-circuit position, the generator 13 produces pulses, but they are ineffective to gate either of the controlled-rectifiers 18R, 18L because the coupling resistor 30R in one branch of the output circuit is effectively short-circuited by the diode 32 and switch 28L in series, and the primary of coupling transformer 31 in the other branch of the output circuit is effectively shunted by the diode 32 and switch 28R in series. In brief, current is prevented from flowing in resistor 30R because the breakdown voltage of Zener diode 29R is greater than the forward voltage drop of diode 32; Zener diode 29L performs a similar function in precluding current flow in the primary of transformer 31. The provision of diode 32 and Zener diodes 29R, 29L in addition to direction-switches 28R, 28L thus provides an Exclusively-Or gate for control of the reversible motor 10, i.e., the motor 10 is turned on by the pulse output of generator 13 when only one or the other of the direction-selector switches 28R, 28L is closed.

The control pulses for turning off the controlled-rectifiers 18R, 18L are derived from the pulse-duration circuits 14R, 14L respectively. Since these circuits are identical in composition, only one of them need be specifically described particularly since the corresponding elements of both circuits are identified by the same reference numbers and distinguished by the letter suffix R or L.

When the controlled-rectifier 18R is gated to conductive state, it not only completes the motor circuit 16R, 17, as above described, but also completes a circuit for charging the capacitor 35R through the inductance 36R and resistor 37R. The magnitude of resistor 37R is chosen to be somewhat greater than that providing critical damping of the otherwise oscillatory circuit formed by inductance 36R and capacitor 35R. The turning on of controlled-rectifier 18R also initiates the operation of a control-pulse generating circuit 38R including the unijunction transistor 39R. The #1 base electrode of this transistor is connected to the anode of controlled-rectifier 18R through the primary winding of pulse transformer 40R and the #2 base electrode is connected to the common terminal of resistors 41R, 42R connected as a voltage-divider between line 11 and the anode of controlled-rectifier 18R. The emitter of unijunction transistor 39R is connected to the #2 base electrode through the variable resistance means provided by rheostat 44R and the resistor 45R. The emitter is also connected to the anode of controlled-rectifier 18R by the capacitor 46R which starts to charge through resistors 41R, 45R and 44R, when the controlled-rectifier 18R is turned on.

After a time interval which can be preset by adjustment of the variable resistance 44R, the generator 38R produces an output pulse which as applied by transformer 40R connected between the gate electrode and cathode of controlled-rectifier 47R is effective to gate that controlled-rectifier to the conductive state. The capacitor 35R thereupon discharges through a path including diode 48R, the now conductive controlled-rectifier 47R and the previously uncharged capacitor 49R. It is to be noted that the damping resistor 37R is effectively excluded from this discharge path because it is shunted by the low forward resistance of diode 48R. The discharge current of capacitor 35R applies a reverse voltage to controlled-rectifier 18R which accordingly reverts to the non-conductive state so terminating flow of current through the motor and through the pulse generator circuit 38R. However, the capacitor 49R continues to charge through inductance 36R and the now conductive controlled-rectifier 47R until the voltage applied to that capacitor, due to the current-forcing effect of inductance 36R, exceeds that of the supply line. At that time the cathode of controlled-rectifier 47R becomes more positive than its anode so that this rectifier reverts to its non-conductive state. With its undamped oscillatory charging circuit now open, the capacitor 49R discharges through the bleeder resistor 50R.

Figure 2:
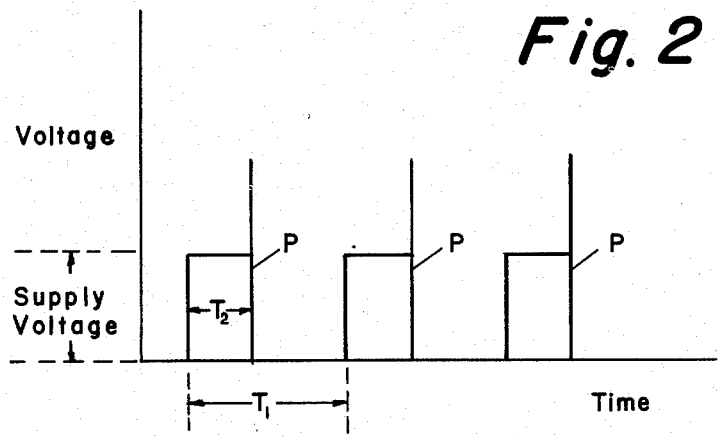
FIG. 2 is an explanatory figure showing voltage pulses as supplied for excitation of the motor of FIG. 1.

This completes one cycle, initiated by closure of switch 28R, during which a single energizing pulse has been applied to motor 10 to drive it in the R direction so long as the switch 28R remains closed. This cycle repeats each time the pulse generator 13 supplies a gating pulse to the controlled-rectifier 18R. Thus, with switch 28R closed, the motor 10 is energized by a succession of pulses P, shown in FIG. 2, whose number per unit of time is determined by the repetition frequency of pulse generator 13 as preset by adjustable resistance 23 and whose time-duration is determined by the pulse-duration circuit 14R as preset by adjustable resistance 44R. The effective amplitude of the pulses P is constant and is essentially nearly equal to the supply voltage: the spikes at the trailing edges of the pulses P have no effect upon the motor performance because the order of magnitude of the motor time-constant is very much greater than the duration of these voltage spikes.

Since for a series-motor the torque produced is proportional to the second power of the motor current, the optimum starting torque for all motor speeds and for any motor load may be obtained by adjusting the pulse duration time $T_2$ of a single pulse P so that the motor current is afforded sufficient time to rise to the value for which the motor torque is capable of moving the armature by a small definite amount. In many installations, different pulse durations are required for opposite directions of rotation to afford optimum starting torque or different motor speeds for both directions of rotation. Such requirement is met in the system shown by provision of the two time-duration circuits 14R, 14L, each with its own time-duration adjustment such as afforded by the variable resistor 44R, 44L respectively. After such adjustment of pulse-duration for both directions of rotation has been made, the desired motor speed is independently preset by adjusting the repetition rate of pulse generator 13 as afforded by variable resistor 23. In practice, a one-sixth horse-power governor motor has been driven over a continuous range of speed from full speed of 1500 r.p.m. at rated load to a slow speed of one revolution per hour. Such slow speed is stable and easily reproducibly obtained; even slower speeds are obtainable by increasing the time-constant of the RC circuit including resistors 23, 24 and capacitor 25.

It is to be noted that with both switches 28R, 28L open, the diode 32 prevents bias current from flowing through the transistor 20 from the #2 base electrode to the #1 base electrode and thus allows capacitor 25 to be in a charged state under standby conditions. Thus, when either contact 28R or 28L is closed, a gating pulse is immediately produced and applied to the proper one of the controlled-rectifiers 18R, 18L: specifically, the response time from contact closure until an energizing pulse is applied to motor 10 is less than five microseconds.

The diodes 55R, 55L respectively clamp the anodes of controlled-rectifiers 18R, 18L to the potential of the positive supply line 11 when these controlled-rectifiers revert to their non-conductive state, so to suppress the voltage transient then occurring because of the energy stored in the motor inductance.

The capacitors 51R, 51L connected between the cathodes and gating electrodes of controlled-rectifiers 18R, 18L respectively are filter capacitors for suppression of transients. The capacitors 43R, 43L connected between the two base electrodes of each of the unijunction transistors 39R, 39L respectively are filter capacitors for suppression of transients especially the aforesaid spikes of pulses P.

The diodes 19R, 19L prevent their respective pulse-duration circuits 14R, 14L from being undesirably excited by transformer action or by virtue of the voltage across armature 17 when the opposite motor field 16L or 16R is energized. Diodes 19R, 19L also prevent large reverse voltage spikes induced in the unexcited winding from being applied across controlled-rectifiers 18R, 18L.

Reverting to the pulse-duration circuit 14R as exemplary of both pulse-duration circuits, the combination of diode 48R and resistor 37R is of particular significance in controlling an inductive load. As above stated, the resistance of resistor 37R somewhat exceeds the critical damping value for the LC circuit formed by inductance 36R and capacitor 35R to prevent oscillation when controlled-rectifier 18R is turned on. If this circuit were allowed to oscillate when shock-excited, the current reversal through capacitor 35R would subtract from the flow of anode current through controlled-rectifier 18R and could reduce it below the hold-in value. The result would be that controlled-rectifier 18R would revert to non-conductive state upon termination of the gating pulse rather than after a time determined by the pulse-duration. However, with provision of resistor 37R, the charging current through capacitor 35R actually aids the hold-in of controlled-rectifier 18R. In cases where motor or other inductive loads are controlled and a minimum load current is required to hold in the controlled rectifier 18R, the capacitor 35R provides for flow of anode current of rectifier 18R while the load current is rising. The diode 48R effectively excludes the damping resistor 37R from the discharge circuit of capacitor 35R so that such reverse current is promptly effective to shut off controlled-rectifier 18R in termination of each motor-energizing pulse P.

The fail-safe circuit 15 includes capacitor 57 which is connected between supply line 11 and the center-tap of resistor 58 in turn connected across the motor field coils 16R, 16L. The capacitor 57 is shunted by a bleeder resistance 53 of suitably high magnitude. With the system functioning normally, the voltage across capacitor 57 never exceeds a predetermined maximum fraction of the supply-line voltage and the coil 59A of the latching relay remains de-energized with its normally-closed contact 60 maintaining connection of the line 11 to the supply source. Should any system component fail and result in continuous energization of motor 10, the voltage across capacitor 57 rises to a value sufficient to break down the four-layer diode 65 or equivalent. In consequence of the resulting discharge of capacitor 57 through the coil of relay 59A, the relay contact 60 is moved to its latched-out position for which the line 11 is disconnected from the supply source.

Figure 3:
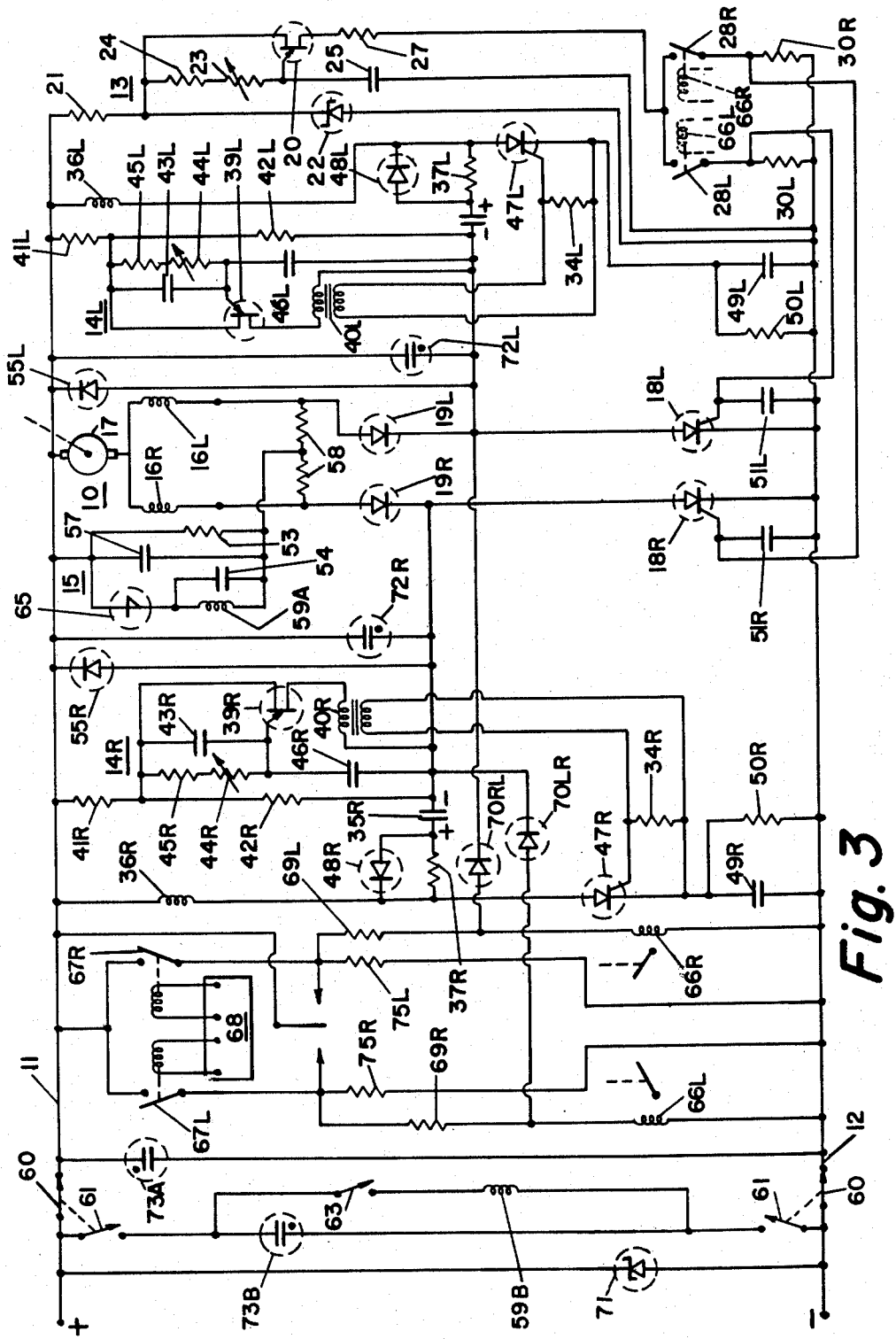
FIG. 3 is a circuit diagram of a modification of the system of FIG. 1.

The system shown in FIG. 3 is essentially the same as that of FIG. 1 except in respects discussed below. The corresponding elements of both systems are identified by the same reference characters so that in general the preceding description of FIG. 1 is applicable to FIG. 3 and need not be repeated.

In the system of FIG. 3, the latching relay of the fail-safe circuit 15, in addition to normally-closed line contacts 60, is provided with normally-open contacts 61. When under abnormal circuit conditions the operating coil 59A of the relay is momentarily energized by the discharge of capacitor 57, the relay contacts 60 open as before to disconnect the supply source from the lines 11, 12, and in addition the relay contacts 61 are closed. To restore the system to operative condition after the fault has been located and corrected, the switch 63 is momentarily closed to connect the reset coil 59B of the fail-safe relay to the supply source through the now closed relay contacts 61. In consequence, the line contacts 60 are restored to their normally-closed position for connection of the power source to the system and the contacts 61 of the reset circuit are returned to their normally-open position.

In the system of FIG. 3, the direction-selector switches 28R, 28L are the contacts of relays 66R, 66L respectively. Thus, if the contact 67R of the external controller 68 is closed by a directional cam or relay (see United States Letters Patent Nos. 3,008,072, 2,886,102), as in response to a requirement for increased generation, the relay 66R is energized to effect closure of its contact 28R whereupon the pulse generator 13 is activated, as previously described, to effect pulse-excitation of motor 10 in the Raise direction. Conversely, if the contact 67L of the external controller 68 is closed, as in response to a requirement for decreased generation, the relay 66L is energized to effect closure of its contact 28L so to activate the pulse generator 13. The resulting pulse output of generator 13 as appearing across coupling resistor 30L is directly applied as gating pulses for the controlled-rectifier 18L so to provide pulse-excitation of motor 10 in the Lower direction. The control of the motor 10 in accordance with the closure of contacts 67R or 67L may include proportional, rate and reset action when the controller 68 is of the type disclosed in aforesaid U.S. Patent 3,008,072.

It is to be noted that in FIG. 3, unlike FIG. 1, both of the two branches of the output circuit of pulse generator 13 are directly coupled to the gate input circuits of controlled-rectifiers 18R, 18L and that such output circuit is lacking the diodes 29R, 29L, 32 of FIG. 1, there used to afford an Exclusively-Or function. In the system of FIG. 3, such Exclusively-Or function is provided by interlocking associated with controller 68. However, a condition of chatter of the output contacts of controller 68 may arise during the initial adjustment of the controller; for this reason the diodes 70RL and 70LR are used.

The junction of resistor 69R and the winding of relay 66L is connected via diode 70LR to the anode of controlled-rectifier 18R and the junction of resistor 69L and the winding of relay 66R is similarly connected via diode 70RL to the anode of controlled-rectifier 18L. Thus, when the rectifier 18R is in conductive state, as a result of closure of direction-selector switch 67R, the coil of relay 66L is effectively short-circuited by the diode 70LR and controlled-rectifier 18R in series so that closure of direction-selector switch 67L does not result in energization of relay 66L. Conversely, when controlled-rectifier 18L is in conductive state, as a result of closure of direction-selector switch 67L, the coil of relay 66R is effectively short-circuited by the diode 70RL and rectifier 18L in series so that the closure of direction-selector switch 67R does not result in energization of relay 66R. Consequently the chattering of output contacts of controller 68 cannot cause both fields of the motor 10 to be energized simultaneously.

The Zener diode 71 connected directly between the supply lines 11, 12 is for suppression of line transients: such diode may also be added to the system of FIG. 1 for like purpose. The Neon bulbs 72R, 72L are connected across the supply line in series with the controlled-rectifiers 18R, 18L respectively and so indicate by flashing when the motor 10, which may be remote or concealed, is being pulsed and in which direction it is being operated. Such indicators may be added to the system shown in FIG. 1. The Neon bulbs 73A, 73B are connected across the supply line in series with the relay contacts 60, 61 respectively. Thus, if neither of the indicators 72R or 72L is flashing but indicator 73A is lighted, it is known that the system is energized. If, on the contrary, the indicator 73A is out and indicator 73B is lighted, it is known that a failure resulting in excessive operation of motor 10 has occurred in the system: if both indicators 73A and 73B are out, a failure of the supply source or its connections is indicated.

The following table is exemplary of suitable circuit constants for a supply source from 100 to 150 volts D.C.

Table I

| Capacitors: | Microfarads |
| --- | --- |
| 51R, 51L | 0.47 |
| 57 | 40 |
| 25 | 3 |
| 49R, 49L; 35R, 35L | 2 |
| 46R, 46L | 1 |
| 43R, 43L | 0.15 |
| 54 | 0.05 |

| Resistors: | Ohms |
| --- | --- |
| 34R, 34L | 33 |
| 37R, 37L | 270 |
| 30R, 30L | 12 |
| 27 | 4.7 |
| 42R, 42L | 680 |
| 50R, 50L | 3.3K |
| 24 | 4.7K |
| 21 | 5K |
| 41R, 41L | 3K |
| 45R, 45L | 10K |
| 44R, 44L | 150K (max.) |
| 58, 58 | 68K |
| 53 | 47K |
| 69R, 69L; 75R, 75L | 10K |
| 23 | 1 meg. (max.) |

| Inductors: | Millihenry |
| --- | --- |
| 36R, 36L | 10 |

Figure 4:
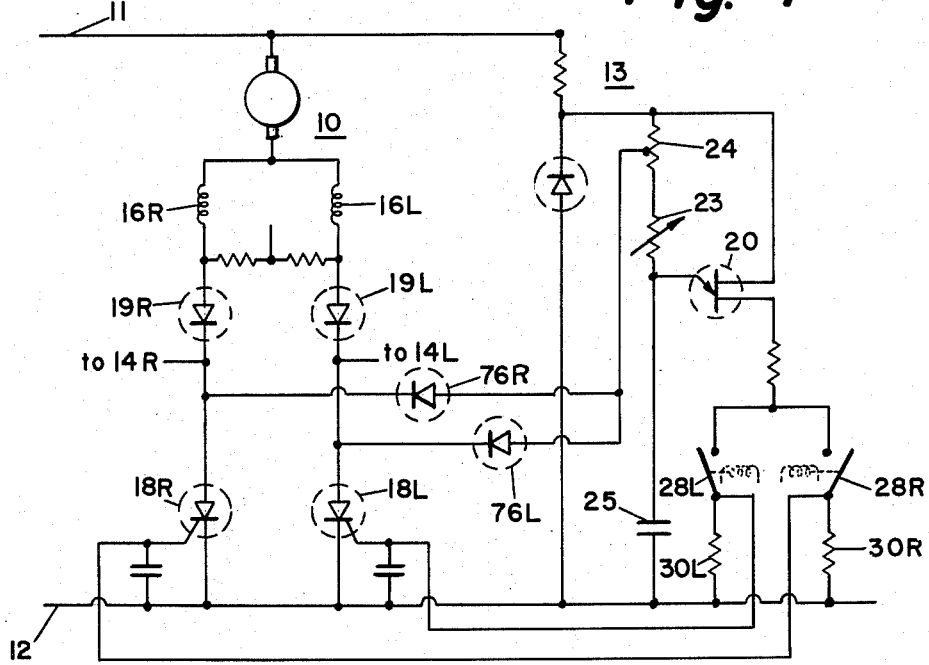
FIG. 4 is a circuit diagram of a modification of part of the control systems of FIGS. 1 and 3.

In the systems of FIGS. 1 and 3, the pulse generator 13 is free-running so long as either or both of the contacts 28R, 28L is closed and so initiates pulses at a preset time interval which is independent of the preset pulse-duration for either direction of motor rotation. In the modified arrangement, in part shown in FIG. 4, the anodes of the controlled-rectifiers 18R, 18L are respectively connected through the diodes 76R, 76L to the midpoint of resistor 24 of the emitter circuit of transsistor 20. Thus, with the controlled-rectifier 18R in conductive state as a result of closure of direction-selector switch 28R, the diode 76R and controlled-rectifier 18R provide a current path which disables the pulse generator 13 until the pulse-duration circuit 14R terminates conduction by rectifier 18R and so re-starts the pulse generator 13 for its next cycle. Conversely, with the controlled-rectifier 18L in conductive state as a result of closure of direction-selector switch 28L, the diode 76L and rectifier 18L provide a path which disables the pulse generator 13 until the pulse-duration circuit 14L terminates conduction by controlled-rectifier 18L and so re-starts the pulse generator 13 for its next cycle.

Although the apparatus of FIGS. 1 and 3 is shown as under the control of switch or relay contacts, it will be understood that semi-conductors operated as switches may be used in place of contacts 28R, 28L, 67R and 67L. Furthermore, it is feasible to control the frequency of operation of pulse generator 13 by voltage signal of variable magnitude which controls the charging current of capacitor 25 of the pulse generator 13.

It shall be understood the invention is not confined to the arrangements specifically illustrated and described, but also comprehends modifications thereof within the scope of the appended claims.

What is claimed is:

1. A system for supplying direct-current pulses to a load device from a source of direct-current voltage comprising a first controlled-rectifier in series between said load device and said source, a first capacitance means in a charging circuit completed by said first controlled-rectifier when in conductive state, a control-pulse generator activated when said first controlled-rectifier is in conductive state, means for gating said first controlled-rectifier to conductive state to initiate an energizing pulse for said load device, to activate said control-pulse generator, and to effect charging of said first capacitance means, means for terminating each energizing pulse of said load device and deactivating said control-pulse generator comprising a second controlled-rectifier in series with said first capacitance means in a normally open path in shunt to said first controlled-rectifier and gated to conductive state by a control pulse from said generator whereby the reverse voltage of said first capacitance means effects reversion of said first controlled-rectifier to a non-conductive state, and a second capacitance means in series with said second controlled-rectifier and charged therethrough to a reverse voltage for which said second controlled-rectifier reverts to a non-conductive state.

2. A system as in claim 1 in which said second capacitance means is shunted by a bleeder resistor having resistance of high magnitude.

3. A system as in claim 1 in which the charging circuit of said first capacitance means includes an inductance means and resistance means of magnitude exceeding the critical damping value of said charging circuit.

4. A system as in claim 3 in which said resistance means is shunted by a diode poled to exclude said resistance means from the discharge circuit of said first capacitance means including said second controlled-rectifier and said second capacitance means.

5. A system as in claim 1 in which an inductance means is common to the charging circuits of both said first capacitance means and said second capacitance means.

6. A system as in claim 5 in which the charging circuit formed by said inductance means, said first capacitance means and said first controlled-rectifier includes damping resistance means excluded from the charging circuit formed by said inductance means, said second capacitance means and the second controlled-rectifier.

7. A system as in claim 5 in which said damping resistance means is shunted by a diode poled to exclude said resistance means from the discharge circuit of said first capacitance means including said second controlled-rectifier and said second capacitance means.

8. A system as in claim 1 in which the load device has inductive reactance delaying the rise of the energizing circuit pulses, and in which the charging circuit of said first capacitance means includes resistance means to maintain the current through said first controlled-rectifier above its hold-in value during said rise of energizing current.

9. A system as in claim 1 in which said source of direct-current voltage also supplies the charging current of said first and second capacitance means.

10. A system as in claim 1 which additionally includes an RC circuit in series with said first controlled-rectifier and comprising capacitance means and bleeder resistance means, and a relay coil and a voltage-sensitive device in series across said capacitance means for energization of said relay coil when the voltage of said capacitance means exceeds the threshold voltage of said device, said relay coil when energized effecting disconnection of said direct-current source from said load device.

11. A system as in claim 1 in which the load device is inductively reactive and which is shunted by a diode reversely poled with respect to said first controlled-rectifier to suppress the voltage surge due to energy stored in the inductance of said device when said first controlled-rectifier reverts to non-conductive state.

12. A system for supplying direct-current pulses from a direct-current source to a reversible series motor having an armature and two field windings, said system comprising a first pair of controlled-rectifiers respectively in series with said source and one of said field windings, a first pair of capacitance means in charging circuits respectively in parallel to said armature and one of said field windings, a pair of pulse-duration circuits each comprising a control-pulse generator in parallel with said armature and corresponding one of said field windings, and a second controlled-rectifier which is in series with said source, a second capacitance means and an inductance means; a pair of direction-selector switches, and a pulse-repetition generator activated by closure of either of said switches and providing gating pulses for a corresponding one of said first controlled-rectifiers, each of said gating pulses thereby initiating an energizing pulse for driving said motor in a selected one of its opposite directions of movement, activating a corresponding one of said control-pulse generators, and energizing the charging circuit of a corresponding one of said first capacitance means, the activated control-pulse generator producing a control pulse gating said second controlled-rectifier whereby the reverse voltage of the charged one of the first capacitance means effects reversion of said one of the first controlled-rectifiers to non-conductive state to terminate an energizing pulse of the motor, and whereby the charging of said second capacitance means through said inductance means subsequently effects reversion of said second controlled-rectifier to its non-conductive state.

13. A system as in claim 12 additionally including diodes cooperating with said direction-selector switches to provide an Exclusively-Or circuit precluding concurrent energization of said field windings of the motor.

14. A system as in claim 12 additionally including a pair of diodes each in circuit with one of said field windings and the associated one of said first controlled-rectifiers to prevent the energizing pulses supplied to either one of said windings from affecting the circuits associated with the other of said windings.

15. A system as in claim 12 additionally including a pair of reversely poled diodes respectively connected in series with the corresponding one of said first controlled-rectifiers across said source of D.C. voltage to suppress voltage surges due to the energy stored in the inductance of each field winding when its associated first controlled-rectifier reverts to non-conductive state.

References Cited by the Examiner

UNITED STATES PATENTS 2,669,684  2/54  MacGeorge _____ 318—297 X
3,095,543  6/63  Cockrell _____ 321—19

OTHER REFERENCES

Publication: GESCR Manual 2nd edition, Auburn, N.Y., 1961, pages 50, 72, 73, 95 and 96, TK 2798 G4g.

ORIS L. RADER, *Primary Examiner.*